(12) United States Patent
Valle

(10) Patent No.: US 6,679,797 B2
(45) Date of Patent: Jan. 20, 2004

(54) FRONT DERAILLEUR FOR BICYCLE WITH ELECTRICAL MOTOR AND GEAR REDUCER

(75) Inventor: Maurizio Valle, Vicenza (IT)

(73) Assignee: Campagnolo SRL, Vicenza (IT)

( * ) Notice: Subject to any disclaimer, the term of this patent is extended or adjusted under 35 U.S.C. 154(b) by 0 days.

(21) Appl. No.: 09/920,763

(22) Filed: Aug. 3, 2001

(65) Prior Publication Data
US 2003/0027674 A1 Feb. 6, 2003

(30) Foreign Application Priority Data
Aug. 3, 2000 (IT) ..................... TO2000A0774

(51) Int. Cl.[7] ............................................... F16H 63/00
(52) U.S. Cl. ........................................... 474/80; 474/78
(58) Field of Search .............................. 474/78, 80, 82, 474/83

(56) References Cited

U.S. PATENT DOCUMENTS

| 3,863,512 A | | 2/1975 | Crawley | |
| 3,919,891 A | * | 11/1975 | Stuhlmuller et al. | 474/70 |
| 4,041,788 A | | 8/1977 | Nininger, Jr. | |
| 4,922,164 A | | 5/1990 | Jacobsen et al. | |
| 5,213,548 A | * | 5/1993 | Colbert et al. | 474/71 |
| 5,470,277 A | * | 11/1995 | Romano | 474/110 |
| 5,480,356 A | | 1/1996 | Campagnolo | |
| 5,514,041 A | | 5/1996 | Hsu | |
| 6,162,140 A | * | 12/2000 | Fukuda | 474/70 |
| 6,350,212 B1 | | 2/2002 | Campagnolo | |

FOREIGN PATENT DOCUMENTS

| DE | 4340471 | * | 2/1995 | B62M/25/08 |

* cited by examiner

Primary Examiner—Thomas R. Hannon
Assistant Examiner—Vicky A. Johnson
(74) Attorney, Agent, or Firm—Volpe and Koenig, P.C.

(57) ABSTRACT

Front bicycle derailleur comprising an electrical motor controlling an actuating arm, consisting of an extension of an articulated arm of the derailleur, by means of a geared reduction transmission, comprising a worm screw and a sector gear, or a bevel pair.

7 Claims, 4 Drawing Sheets

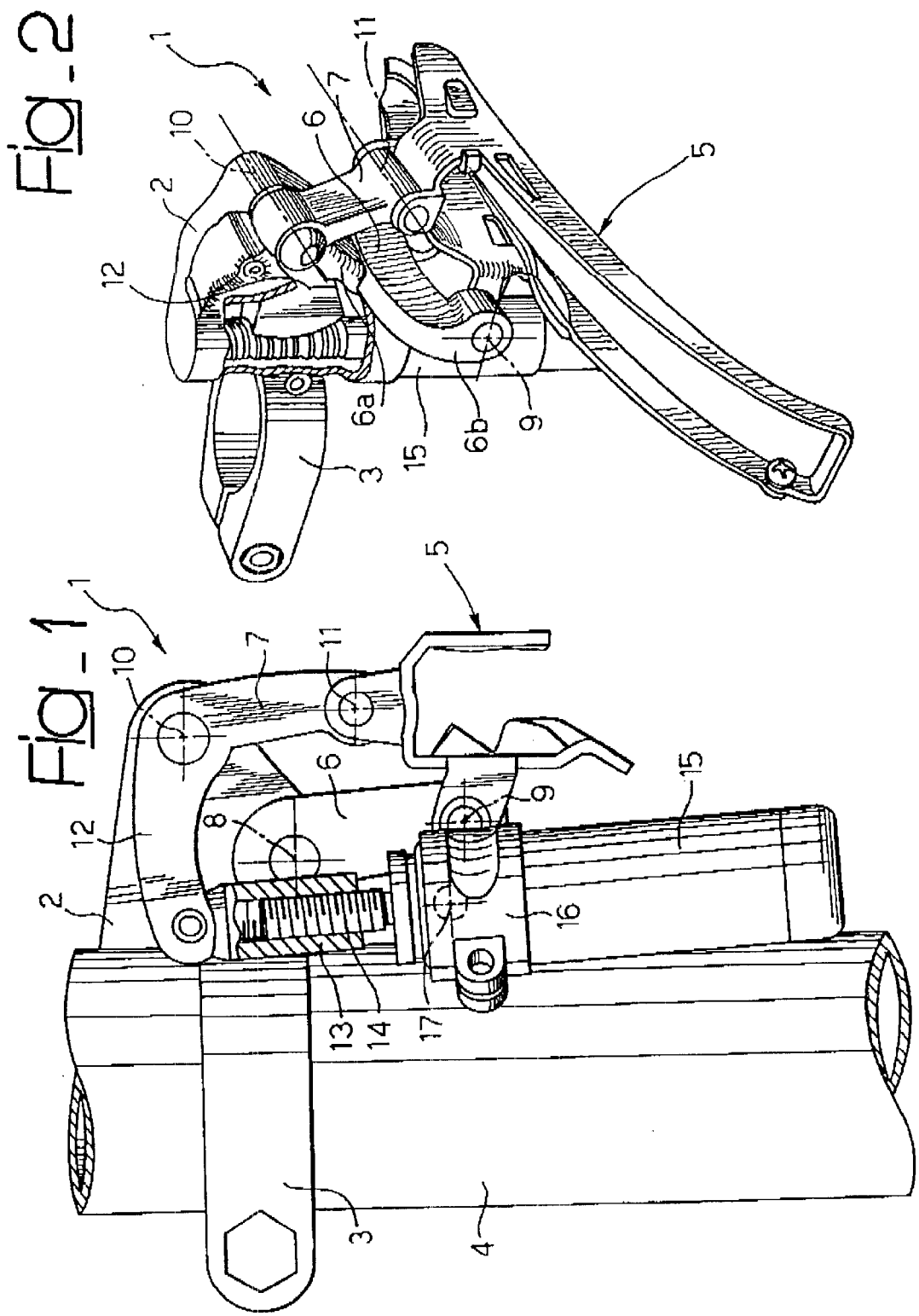

Figure 3:
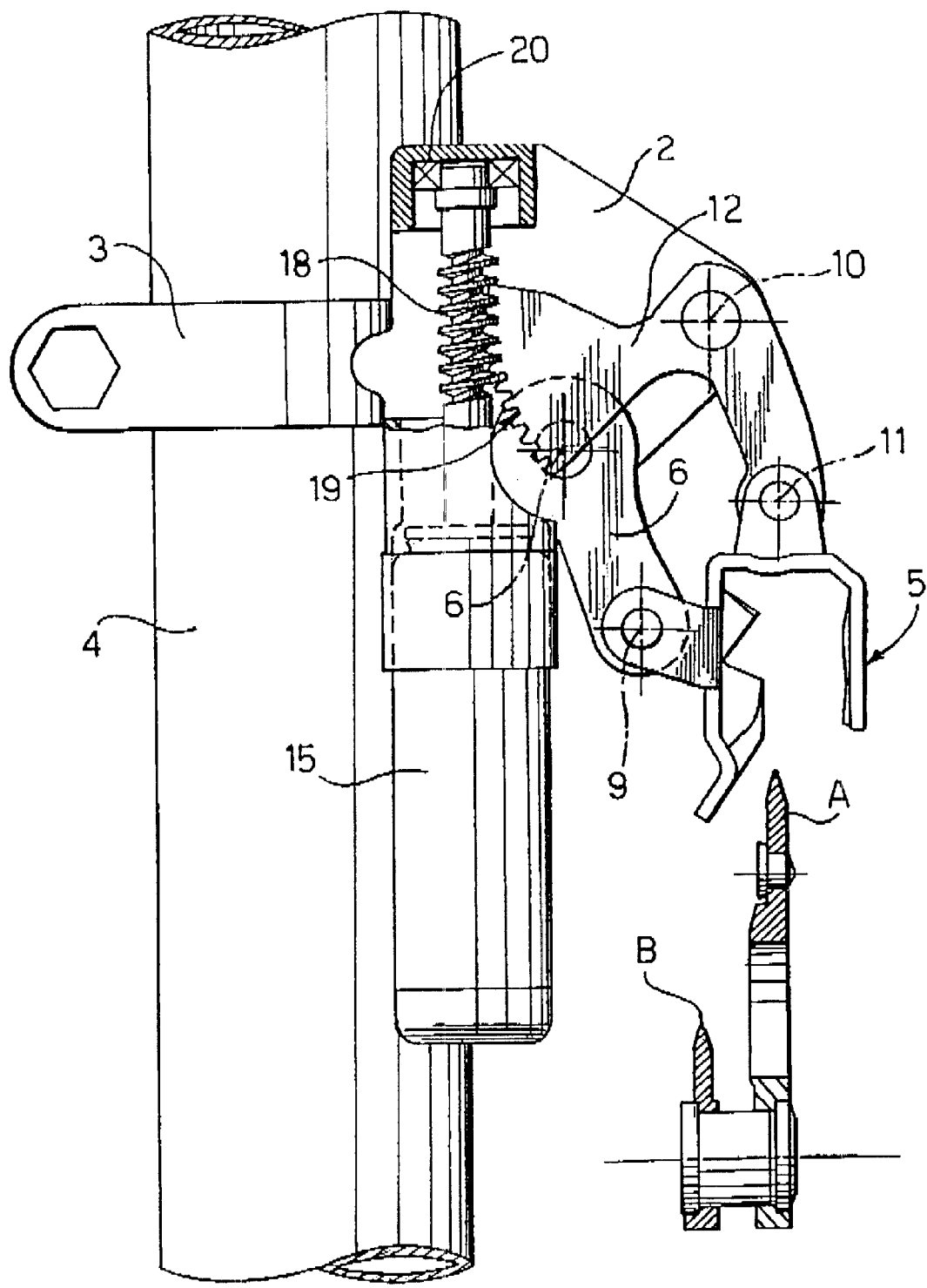

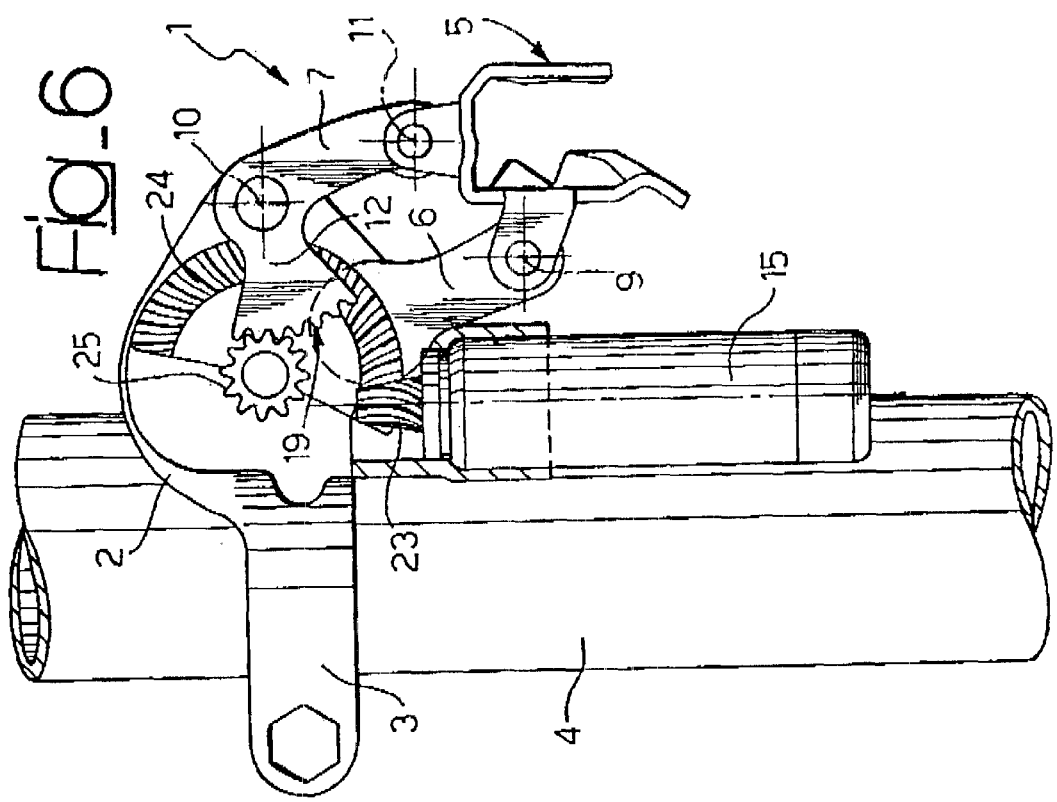
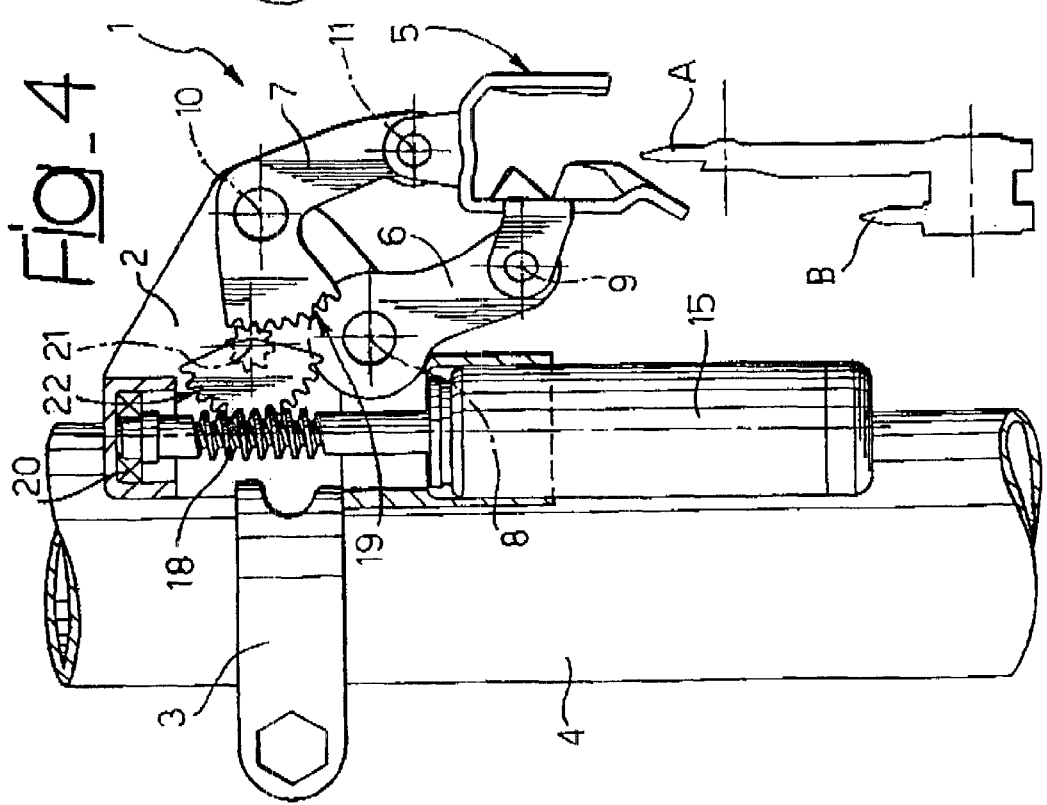

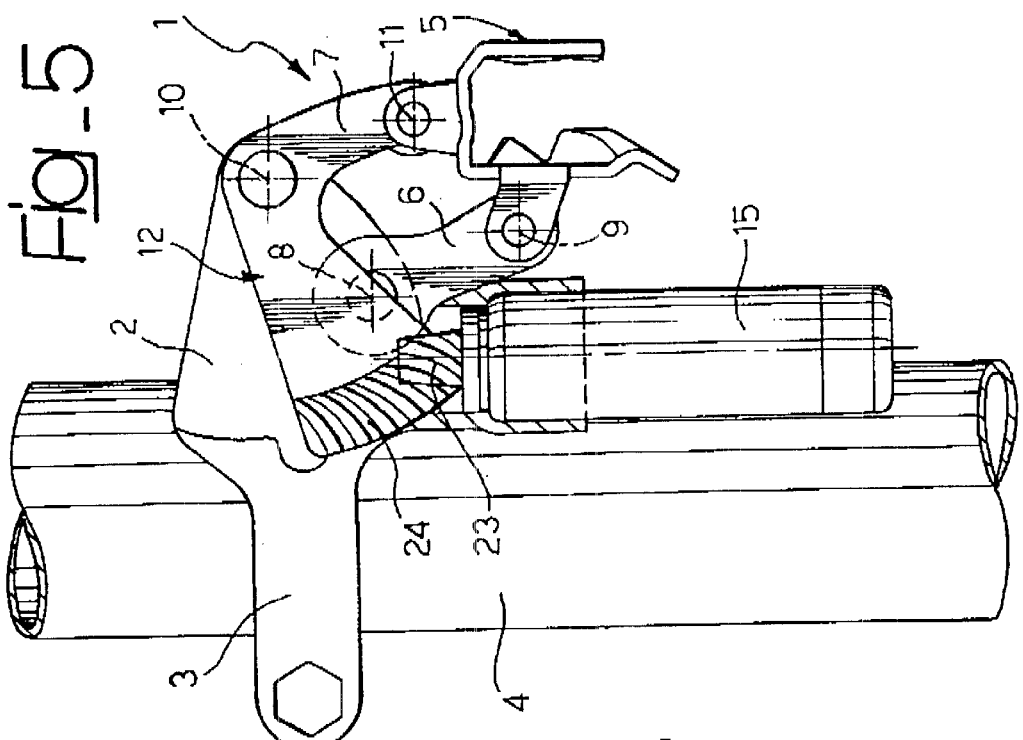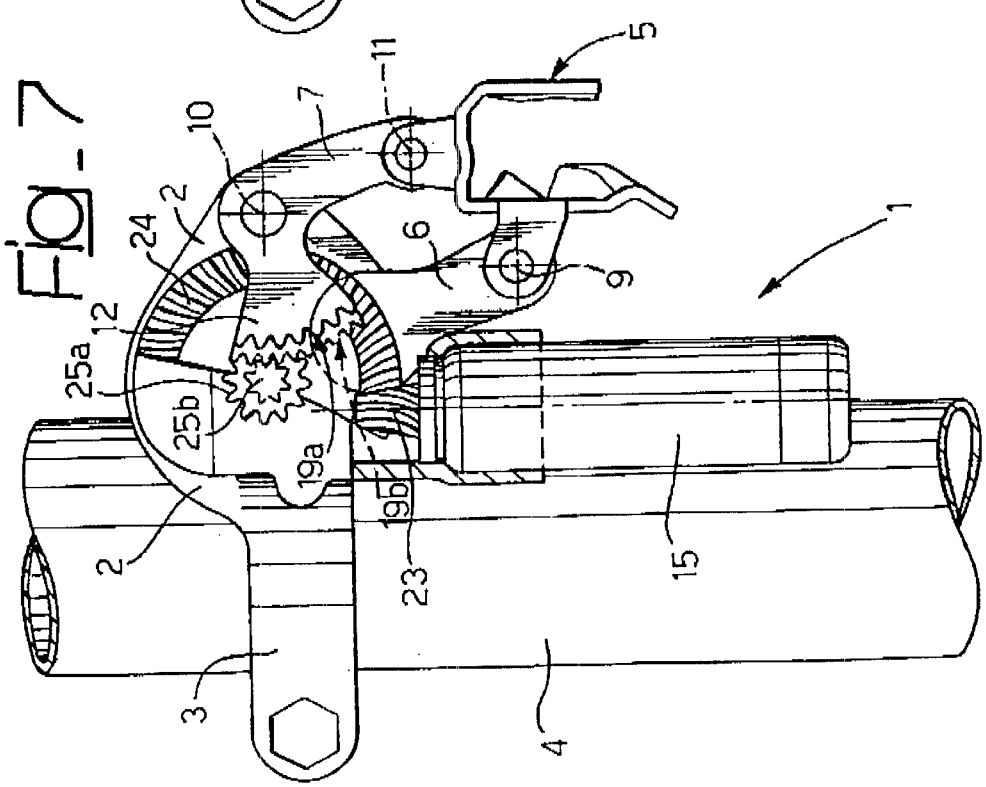

FRONT DERAILLEUR FOR BICYCLE WITH ELECTRICAL MOTOR AND GEAR REDUCER

DESCRIPTION

This invention relates to front bicycle derailleurs of the type comprising:

a supporting body fastened to the bicycle frame, a fork unit for derailing the bicycle chain, means for connecting the fork unit to the supporting body, including at least one arm, which ends pivot on the supporting body and the fork unit, an actuating arm, consisting of an extension of said pivoting arm and, and electrical motor associated to the supporting body for controlling said actuating arm.

A front derailleur of the type described above is illustrated in FIG. 5 of U.S. Pat. No. 5,470,277 by the Applicant, and in FIG. 11 of Italian Patent Application no. TO99A001023, also by the Applicant, still secret at the registration date of this application. FIG. 1 of the accompanying drawings, provided for quick reference, shows a front derailleur of the type presented in the Italian Patent Application mentioned above. In this figure, the front derailleur is generally indicated with reference numeral 1. It comprises a supporting body 2 with a band 3 for fastening to a tube of a bicycle frame. Numeral 5 generally refers to a fork unit, of the known type, for chain derailing (not illustrated) of the bicycle for the selective engagement of said chain with the sprockets (not shown) associated to the central movement of the bicycle. The fork unit 5 is connected to the supporting body 2 by means of an articulated parallelogram system, comprising two arms 6, 7 respectively pivoting in 8, 9 and 10, 11 to the supporting body 2 and to the fork unit 5. The articulated arm 7 arranged on the external side extends to actuating arm 12, forming a single part with arm 7 at an angle of approximately 90°. A worm screw element 13, fastened onto a screw 14, connected to the output shaft of an electrical motor 15 of the front derailleur, pivots on the arm 12. The electrical motor 15 is equipped with a band 16 for connecting the motor body in a pivoting fashion on an axis 17 of the derailleur 2, because the motor must be able to oscillate on the axis 17 when, following operation, the arm 12 makes an angular oscillation on the articulation on the support unit 2.

Said solution, previously presented by the Applicant, was not fully satisfying on operative level, for various reasons. Firstly, the electrical motor must make a high number of turns to move the fork unit between its two extreme positions. Secondly, as mentioned, due to the system geometry, the motor 15 must be fitted to pivot on axis 17, and operatively occupies a relatively large space, with the additional problem of possible coupling play. Finally, with the geometry illustrated in FIG. 1, a wide maximum excursion of the front derailleur cannot be obtained if the dimensions are to be kept relatively low, without seizing. This is required, for example, in the cases in which three sprockets are associated to the central movement.

In order to solve all said problems, this invention relates to a front derailleur, which characteristics are indicated at the beginning of this description, also characterised in that said electrical motor controls said actuating arm by means of a geared transmission, comprising a first gear connected to the electrical motor shaft and a second gear connected to said actuating arm.

Thanks to this characteristic, the transmission between the electrical motor and the controlled unit performs better than the case illustrated in FIG. 1. Furthermore, by appropriately selecting the transmission ratio achieved by means of said gears, a considerable reduction of revolutions of the motor to take the derailleur from one end of the stroke to the other can be obtained. At the same time, the electrical motor can be fitted so to be fixed with respect to the bicycle frame, i.e. so that it does not oscillate as shown in FIG. 1, with consequent reduction of dimensions and play due to coupling. Finally, the geared transmission, along with the reduced dimensions mentioned above, provide a longer derailleur stroke, also suitable for triple sprocket transmission, without seizing.

In a first form of embodiment, said first gear solidly fastened to the electrical motor shaft is a worm screw and the second gear is a sector gear, preferably forming a single part with said articulated arm and said actuating arm. In a variant of said form of embodiment, the worm screw connected to the electrical motor shaft engages an auxiliary sector gear connected so to turn with a pinion, which in turn engages the sector gear on the actuating arm. This variant is obviously preferred in the case of a two-stage cascade transmission.

In the case of a second form of embodiment, the first gear consists of a tapered pinion connected to the electrical motor, while the second gear is a tapered gear connected to the actuating arm. A variant can be envisaged, in which the tapered pinion connected to the motor shaft engages an auxiliary tapered pinion which is connected so to turn with a tapered gear engaging a sector gear connected to the actuator arm. Also in this case, a double-stage reduction is obtained.

Finally, a geared transmission for selectively operating two different transmission ratios can be envisaged. The preferred transmission ratio selection is obtained by sliding a unit, connected to two coaxial pinions, so to operatively engage one of said pinions on a sector gear, connected to the actuating arm, accordingly. Said selection can be made manually by cyclists according to their specific needs.

This invention will be better explained by the following detailed descriptions with reference to the accompanying figure as non-limiting example, whereas:

FIG. 1 is an elevated view of a plane, perpendicular to the longitudinal direction of the bicycle, showing a derailleur of the type previously proposed by the Applicant, FIG. 2 is a partially sectioned perspective view of a first form of embodiment of this front derailleur according to this invention, FIG. 3 is an elevated view of the derailleur in FIG. 2, on a plane which is perpendicular with respect to the longitudinal direction of the bicycle, FIG. 4 illustrates a variant of FIG. 3, FIG. 5 illustrates a second form of embodiment of this invention, FIG. 6 illustrates a variant of FIG. 5 and, FIG. 7 illustrates an additional variant.

The parts in FIGS. 2–7 in common with those illustrated in FIG. 1 are indicated with the same reference numerals.

In the form of embodiment illustrated in FIGS. 2, 3, the electrical motor 15 is rigidly connected to the support unit 2 and controls the actuating arm 12 by means of a gear, consisting of a worm screw 18 fitted on the motor output shaft extension 15, and by a sector gear 19, forming a single part with the actuating arm 12 and the articulated arm 7. As appears in FIG. 2, in the illustrated stroke example, the articulated arm 6 presents a fork conformation, with a central arm 6a articulated in point 8 to the support unit 2 and two branches 6b (only one of which is visible in FIG. 2).

FIG. 3 also partially illustrates two sprockets A, B associated with the central movement of the bicycle for selectively engaging the transmission chain (not illustrated) of the bicycle, according to the operative function of the fork unit 5. Again with reference to the stroke illustrated in FIG. 3, the worm screw 18 connected to the electrical motor shaft 15 is connected to (and turns on) the upper end of the supporting body 2 by means of a roller bearing 20.

FIG. 4 illustrates a variant of FIG. 3 differing only for the way in which motion is transmitted from the worm screw 18 to the sector gear 19. In the case of FIG. 4, the sector gear 19 engages a pinion 21 connected to turn with a sector gear 22, which engages the worm screw 18, instead of directly engaging the worm screw 18. Consequently, in the form of embodiment illustrated in FIG. 4, transmission comprises a double-stage reduction. More precisely, the first stage consists of the worm screw 18 engaging the auxiliary sector gear 22, and the second stage consists of the pinion 21 engaging the sector gear 19. In this way, the total number of revolutions required by the motor to take the fork unit 5 from one of the extreme positions to the opposite extreme position is additional reduced.

FIG. 5 illustrates a second form of embodiment, in which the electrical motor shaft 15 controls an actuating arm 12 by means of a bevel gear, comprising a tapered pinion 23 connected to the electrical motor shaft 15 and a tapered gear 24 rigidly connected (preferably made of a single part) to the actuating arm 12. In all the forms of embodiment illustrated herein, the actuating arm 12 is in turn made of a single part with the articulated arm 7 of the derailleur.

FIG. 6 illustrates a variant of FIG. 5, in which the tapered gear 24 is free to turn on the supporting body 2, and in which the actuating arm 12 bears a sector gear 19, engaging a pinion 25 connected so to turn with the tapered gear 24. Consequently, also in the form of embodiment illustrated in FIG. 6, the transmission achieves a double-stage reduction: the first stage is obtained by the tapered pinion 23-tapered gear 24 coupling, and the second stage is obtained at the pinion 25-sector gear 19 coupling.

Finally, FIG. 7 illustrates a variant of FIG. 6, in which the actuating arm 12 presents two sector gears 19a, 19b of different radius, for selectively engaging two pinions 25a, 25b, which are solidly fastened so to turn on the tapered gear 24. The tapered gear 24 and the two pinions 25a and 25b form a unit which can axially move with respect to the supporting structure 2 between the two operative positions in which the engagement between the pinion 25a and the sector gear 19a, or the engagement between the pinion 25b and the sector gear 19b is active. The movement of this axially mobile unit is manually controlled by the cyclist, according to the transmission ratio required to exploit the action of the derailleur. For all other aspects, the structure of the apparatus illustrated in FIG. 7 is identical to that illustrated in FIG. 6.

Naturally, as illustrated in FIG. 7, different transmission ratios can be selected also in the case of a transmission comprising a worm screw of the type illustrated in FIG. 4.

Naturally, numerous changes can be implemented to the construction and forms of embodiment of the invention herein envisaged, all comprised within the context of the concept characterising this invention, as defined by the following claims.

What is claimed is:

1. Front bicycle derailleur for use on a bicycle having a frame and a bicycle transmission chain operatively associated with the derailleur, the derailleur comprising:

a supporting body fastened to the bicycle frame;

a fork unit for derailing the chain;

means for connecting the fork unit to the supporting body, including at least one articulated arm having one end which pivots on the supporting body and a second end which pivots on the fork unit; and, an actuating arm, connected to the articulated arm; and, an electrical motor associated with the supporting body for controlling the actuating arm, wherein said electrical motor controls the actuating arm by means of a transmission, mounted on the supporting body, that includes a tapered pinion connected to the electrical motor, a tapered sector gear engaged with the tapered pinion, a first and a second pinion axially aligned with the tapered sector gear, the first pinion having a different diameter than the second pinion, and first and second sector gears of different diameters connected to the actuating arm for selectively engaging the first and second pinions.

2. Front derailleur according to claim 1, wherein said transmission comprises a unit moving between two operative positions for selecting two different transmission ratios, which can be actuated by means of said transmission.

3. A bicycle derailleur for use on a bicycle having a frame and a bicycle transmission chain carried by the frame, operatively associated with the derailleur, the derailleur comprising:

a supporting body for attachment to the bicycle frame;

a fork unit for derailing the transmission chain;

a first articulated arm pivotally attached to the supporting body and the fork unit and an actuating arm extending therefrom;

a second articulated arm having a first end pivotally attached to the fork unit and a second end pivotally attached to the supporting body; and an electrical motor, supported by the supporting body, which controls the motion of the actuating arm by means of a transmission having a first worm gear connected to the electrical motor and operatively associated with a second actuating gear that is rigidly attached to the actuating arm; and an intermediary sector gear, having a diameter, rotatably mounted to the supporting body about a pivot axis and operatively associated with the actuating sector gear, which engages the worm gear.

4. The derailleur according to claim 3, further comprising a pinion, having a diameter different than the diameter of the intermediary sector gear, rigidly attached to and concentrically aligned with the pivot axis, wherein the pinion engages the actuating sector gear.

5. A bicycle derailleur for use on a bicycle having a frame and a bicycle transmission chain carried by the frame, operatively associated with the derailleur, the derailleur comprising:

a supporting body for attachment to the bicycle frame;

a fork unit for derailing the transmission chain;

a first articulated arm pivotally attached to the supporting body and the fork unit and an actuating arm extending therefrom;

a second articulated arm having a first end pivotally attached to the fork unit and a second end pivot ably attached to the supporting body; and, an electrical motor, supported by the supporting body, which controls the motion of the actuating arm by means of a transmission having a first gear connected to the electrical motor and operatively associated with a second gear that is rigidly attached to the actuating arm;

wherein said first gear is a tapered pinion and said second gear is a tapered gear, rigidly connected to the actuating arm, which engages said tapered pinion.

6. A bicycle derailleur for use on a bicycle having a frame and a bicycle transmission chain carried by the frame, operatively associated with the derailleur, the derailleur comprising:

a supporting body for attachment to the bicycle frame;

a fork unit for derailing the transmission chain;

a first articulated arm pivotally attached to the supporting body and the fork unit and an actuating arm extending therefrom;

a second articulated arm having a first end pivotally attached to the fork unit and a second end pivotally attached to the supporting body; and, an electrical motor, supported by the supporting body, which controls the motion of the actuating arm by means of a transmission having a first gear connected to the electrical motor and operatively associated with a second gear that is rigidly attached to the actuating arm;

wherein said first gear is a tapered pinion and said second gear is a sector gear, and wherein the derailleur further comprises a tapered gear, rotatably mounted on the support body about a pivot axis, which engages the tapered pinion, and wherein the derailleur also comprises a second pinion, rigidly attached to the tapered gear and substantially concentrically aligned with the pivot axis, which engages the sector gear.

7. A bicycle derailleur for use on a bicycle having a frame and a bicycle transmission chain carried by the frame, operatively associated with the derailleur, the derailleur comprising:

a supporting body for attachment to the bicycle frame;

a fork unit for derailing the transmission chain;

a first articulated arm pivotally attached to the supporting body and the fork unit and an actuating arm extending therefrom;

a second articulated arm having a first end pivotally attached to the fork unit and a second end pivotally attached to the supporting body;

an electrical motor, supported by the supporting body, which controls the motion of the actuating arm by means of a transmission having a first gear connected to the electrical motor and operatively associated with a second gear that is rigidly attached to the actuating arm; and a third gear of a given diameter, rotatably mounted to the support body about a pivot axis and operatively associated with the first gear, and a fourth gear, having a given diameter different than that of the third gear, attached to the third gear and substantially concentrically aligned therewith, and a fifth gear, rigidly attached to the second gear and concentrically aligned therewith, wherein the fifth and second gears respectively selectively engage the third and fourth gears.

* * * * *